Feb. 12, 1935. C. N. BERGMANN 1,990,926
RECEPTACLE FILLING APPARATUS
Filed Feb. 3, 1932
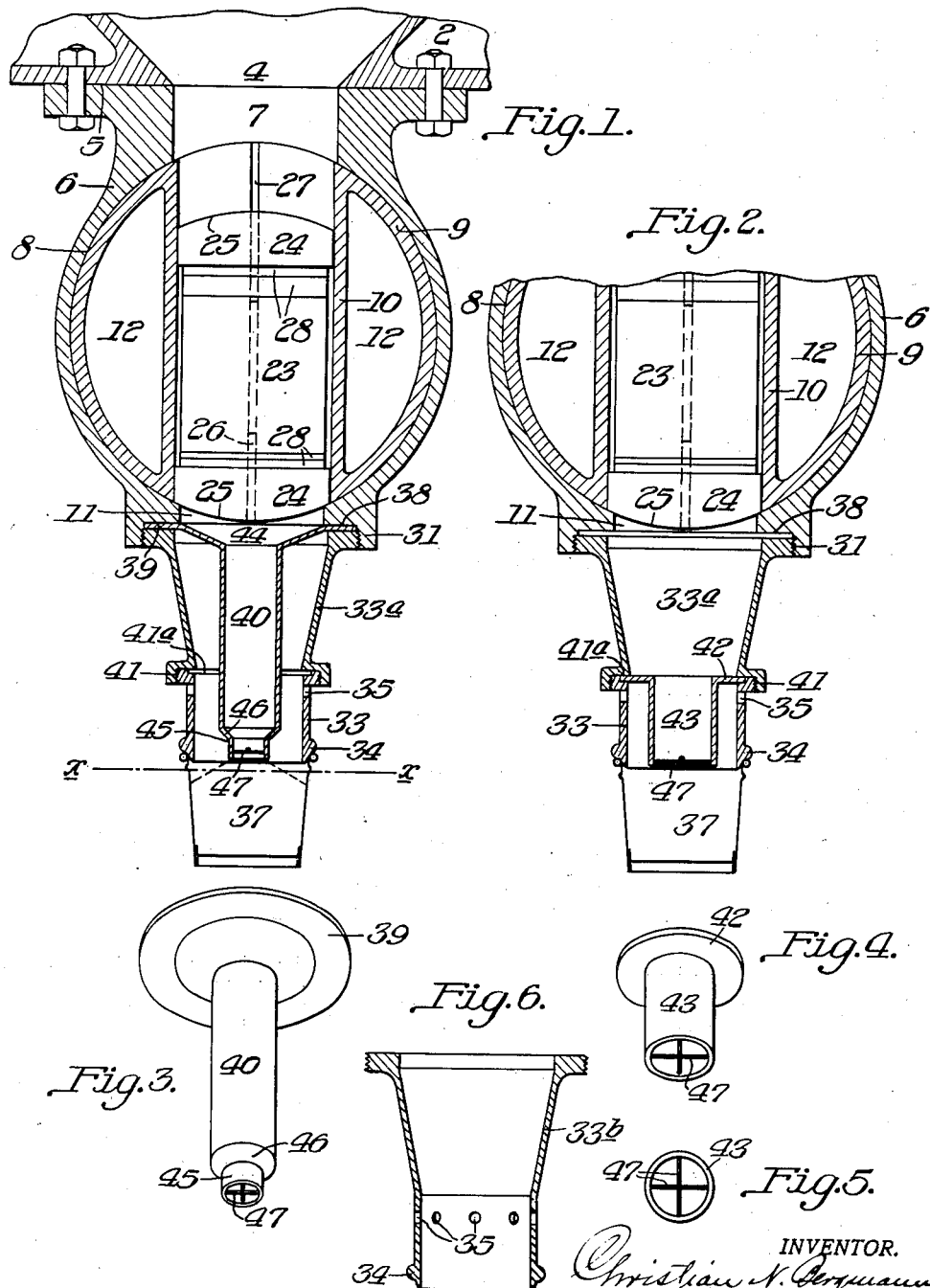

Patented Feb. 12, 1935

1,990,926

UNITED STATES PATENT OFFICE 1,990,926

RECEPTACLE FILLING APPARATUS

Christian N. Bergmann, Pittsburgh, Pa., assignor to Bergmann Packaging Machine Company, Pittsburgh, Pa., a corporation of Delaware Application February 3, 1932, Serial No. 590,536

11 Claims. (Cl. 226—103)

My invention refers to improvements in receptacle filling machines for depositing a measured amount of a suitable commodity into a cup, carton, bottle, or other usable holder.

It has for its object to provide means for delivering a measured amount of such commodity, as ice cream, cottage cheese, mayonnaise, or other similar plastic or semi-fluid substance through a conducting passageway, as a discharge tube, terminating just above the normal filling level of the receptacle, with accompanying complete severance from the supply column.

The improvement consists of appropriate attachments to a receptacle filling apparatus, as hereinafter described, in a machine like that of my prior Patent No. 1,861,734.

In such machine means are provided whereby a measured amount may be charged into the receptacle, utilizing a rotatable measuring holder adapted to extract a definite amount from a superimposed main supply, and to deliver it downwardly through an outlet coping or shell into a receiving receptacle in register therewith.

Heretofore the measured unit of quantity of the plastic commodity ordinarily dropped by gravity to a limited extent through such coping into the receptacle after severance from the rotatable holder.

The present improvement avoids such unconfined movement and overcomes a somewhat frequent incidental undesirable dripping or slopping over the edge of the receptacle by positively directing an intermittently moving confined column of the commodity, with delivery and free severance at its lower end from the receptacle contained mass. The delivered mass or unit corresponds, at each operation, to the limited amount extracted from the main reservoir supply and delivered to the discharge tube.

Referring to the drawing showing certain preferred embodiments of the invention:

Fig. 1 is a vertical sectional view, partly broken away, of one form of machine to which the invention is applied;

Fig. 2 is a similar view, showing a modified construction;

Fig. 3 is a detail view in perspective showing the delivery conduit, as in Fig. 1;

Fig. 4 is a similar view of the conduit of Fig. 2;

Fig. 5 is an under plan view of the delivery terminal of said conduit;

Fig. 6 is a sectional detail view showing a continuous one piece delivery casing.

In the drawing, 2 represents the base of a hopper or reservoir adapted to contain ice cream or other substance or commodity in a sufficiently soft condition to freely flow downwardly through a central delivery opening 4. The bottom of the hopper is preferably planed off smooth underneath, providing a flat attaching surface 5, upwardly against which is secured the closely fitting flat upper surface of the unit measuring drum shell or casing 6.

The latter may be fixedly mounted in registering position with the opening 4 by any suitable securing means, as bolts or screws.

The casing 6 is generally cylindrical in form, having an upper opening 7 registering with opening 4 and leading downwardly into the cylindrical space defined by the annular face 8, within which cylindrical housing is rotatably mounted the drum 9.

Drum 9, as shown, is provided with a middle transverse cylindrical measuring plunger shell or casing 10 opening midway continuously through the drum. The transverse plunger bore is adapted to register at one end and the other with the supply opening from the reservoir and with an opposite discharge opening 11 of casing 6 respectively, in either of two operative positions, effected by a half rotation of the drum.

Shell 10, which is preferably integral with drum 9, may be spaced inwardly from its outer cylindrical portion by intervening clearance spaces 12 at both sides, wholly or partially surrounding shell 10 for lightness and air or liquid circulation if desired, for temperature regulation, with endmost closing plates of suitable construction as disclosed in my prior patent.

The drum 9 is rotated, first in one direction and then reversely, or intermittently in the same direction in half rotation series, by means of a crank or other suitable means, whereby to move and stop the drum for successive receiving and delivery operations for successively delivering a uniform measured unit or quantity downwardly.

The drum may be intermittently rotated continuously in the same direction, with temporary stoppage at each half revolution, by suitable operating mechanism.

Slidably mounted within the transverse cylindrical cavity or shell 9 is the gravity plunger measuring valve 23 which is the acting gravitating or impelling element of the unit measuring mechanism.

Plunger valve 23 is of solid metal for maximum weight or otherwise may be partly hollow with adjusting weights as preferred, and is provided with terminal heads 24—24 rounded as at 25 to the same radius as that of the inner annular face 8 of the shell or casing 6.

When the plunger valve 23 is lowered by gravity as in Fig. 1, one or the other of its part cylindrical ends 25 will therefore neatly fit against the interior cylindrical face of casing 6 during rotation, without interference or undue friction, and will seal the outlet opening when in lowered discharging position.

The middle portion of the plunger valve being slightly less in diameter than its heads, provides an annular space which will become filled with ice cream, or the like, tending to form an air tight packing ring with resulting suction action. A further advantage of such construction is in providing continuous lubrication by such filling for the plunger valve during operation of the machine.

The interior diameter of plunger casing 10 is preferably slightly larger than that of outlet opening 11 providing an annular shoulder for limiting downward movement of the plunger valve against the exposed portion of the inner cylindrical face 8, closing the opening and forming a continuous annular surface with the exterior of drum 9. One or both of heads 24 may be extensible or reducible for varying the length of the plunger when desired.

Heads 24 are provided with fixedly mounted longitudinal keys 26 slidably engaging keyway 27 of the shell 9, and maintaining the plunger valve in proper non-rotatable position, as to its part cylindrical terminals 25 at all times within the casing 10 of rotating drum 9, and with relation to the inner surface of casing 6.

Between the heads and the middle body portion 23 of the plunger are preferably interposed a plurality of adjusting washers 28 which may be of uniform or varying thickness, the purpose of which is to allow for lengthening or shortening of the plunger valve with relation to the fixed length of the plunger cavity within casing 10. The purpose of such construction is to accurately adjust the size of the measuring chamber above the plunger, the heads 24 being held by central screws or other suitable means.

The bottom face of casing 6, upwardly within the threaded rim portion 31, is flat as at 38, providing an annular receiving seat surrounding delivery opening 11. Such portion of the shell is thus annularly shouldered providing a depressed seating face for placement of the upper flanged terminal 39 of the downwardly extending delivery conduit or discharge tube 40.

Because of the fact that the machine as a whole may be ordinarily mounted above the surface of a working platform or table, operating efficiency and economy of time is facilitated by locating the filling level of the receptacle at a fixed convenient position, as on a normal plane x,x, when placed in position.

Also, for visibility, and to avoid obstruction by the supporting frame or other portions of the machine, if present, such plane should be somewhat below the main outlet opening 11. Incidentally also it is in some cases desirable to provide a degree of frictional resistance to the material passing through the discharge conduit or tube 40, for which reason it is somewhat elongated.

For the purpose of providing a closing contact with the upper edge of the receptacle, as a cup 37, or a bottle or the like, I provide an outer shell or casing 33 having a tapered annular terminal around which the upper edge of the receptacle is placed, against an annular limiting shoulder 34. Air circulation openings 35 are provided, allowing for escape of air from the receptacle as it is being filled.

Heretofore shell 33 has been used as a delivery coping for a freely gravitating unit, and has been secured directly into the base extension 31 of the drum casing 6. In the present improvement I have provided a double or single coping construction whereby to surround a continuous elongated conduit from the outlet opening 11 to the receptacle filling level, as in Fig. 1, or a shorter conduit from the top of the lower shell only down to such lever, as in Fig. 2.

The additional or spacing shell 33a is secured by its threaded flange or upper end portion within the threaded rim 31 of casing 6, either with or without the intervening flange 39 of discharge tube 40. In the double form, the shell 33a is of the same or slightly larger interior opening at the top than opening 11, tapering downwardly to the diameter of shell 33, and having threaded connection therewith, as at 41. Shell 33 is recessed as at 41a providing a clamping seat for flange 42 of discharge tube 43 which extends downwardly within coping 33, and also terminates slightly above the normal filling level line x,x.

Conduit or tube 40 has a flaring or funnel shaped receiving opening 44, and as shown, is provided with an inwardly reduced lower terminal 45 towards which the larger upper wall converges, as at 46.

In operation, after the first discharge, conduit 40 is always filled with a continuous section or body of whatever substance is being operated upon. At each half rotation of drum 9 an amount of such substance which corresponds to the amount withdrawn from the reservoir, is forced downwardly from the lower end of tube 40 and into receptacle 37. Tube 40 thus constitutes a continuously full reservoir conduit, discharging at its bottom an amount equaling each unitary amount previously extracted and discharged by the plunger. Likewise, the content of conduit 40 remains static and will not ordinarily discharge by gravitation alone, or until the next plunger movement, due to atmospheric exclusion and resulting suction.

In the same way, the shorter conduit 43 and the entire interior of coping 33a is normally full, with ejection of a measured unit through the shorter conduit at each operation.

The elongated reduced diameter conduit for the full depth of both copings is utilized with easily flowing material, as plastic, semi-chilled or semi-frozen ice cream, mayonnaise, thick sour cream, or other easily flowing material, requiring a degree of retarding frictional resistance.

The shorter somewhat wider conduit 43, on the other hand, is used with material of a stiffer or less fluent consistency, as comparatively stiff ice cream, cottage cheese, peanut butter, jelly, etc.

The terminals of either form of conduit may be left open for their interior cross area at the bottom, or if preferred may be provided with additional resistance elements, as one or more cross wires 47.

By such construction, in connection with the plural copings 33 and 33a I provide for a standard depth extension below the outlet opening 11 of the measuring machine proper, down to a plane slightly above the normal receptacle filling level.

When it is desired to change conduits with the compound form of outer casing, the parts are easily separable for removal and insertion of one form of conduit in place of the other. A further advantage is that one shape or size of coping 33 may be readily substituted by another, dependent on the particular shape or design of the contacting neck of the receptacle being used.

By locating the exit opening of either form of discharge tube slightly above the filling level of the receptacle, it will be charged with a full capacity content during downward flow of the column induced by each operation of the machine.

At each intermittent termination of such flow the contained column will become inert, so that upon removal of the filled receptacle there will be effected an immediate separation from the lower end of the column at the end of the tube without drainage or dripping of any surplus.

This is because the receptacle has been filled at its middle clear up to the lower end of the tube, and when removed the junction between the filled contents and the bottom of the column is the weakest section, and will readily break.

Such separability is also due to the fact that the conduit, and any circulation space above it, is continuously full and only capable of downward movement at each successive unitary supplemental addition from above.

Any cohesion of the material at the desired plane of severance is practically ineffective, due partly to the reduced diameter of the conduit with the existing suction and friction conditions of its interior, aided by the free air circulation through openings 35.

I show in Fig. 6 a modified construction of the surrounding casing or shell 33—33a, in which it is made in one continuous piece, omitting the intermediate threaded connection, but otherwise conforming to the two part construction above described.

Such form of casing may be used where the machine is operating continuously on one substantially uniform kind of material, and with continuous use of a discharge tube like tube 40. In such case the inner walls of the casing, identified by the numeral 33b, are continuously smooth, omitting the interruption by recess 41a, which recess is only useful in connection with the substitution by the shorter delivery tube 43 as described.

The construction and operation of the invention will be readily understood and appreciated from the foregoing description by all those familiar with the art of filling receptacles with various kinds of plastic or other commodities.

Assuming the intermittent discharge from the lower end of the delivery tube 40 or 43 is just sufficient to fill the receptacle 37 up to a level immediately below the covering cap when inserted, the material as delivered rises in the receptacle with a middle closely connecting coniform terminal portion sloping downwardly toward and to its inner annular surface, as indicated by dotted lines in Fig. 1. There is thus formed a reduced middle upper connecting portion which readily breaks away from the lower end of the delivery tube, upon removal of the filled receptacle.

Upon inserting the covering cap the middle portion will be pressed down and the lower surrounding portions will rise to the common level x—x underneath the cover, thus equalizing the contents to such common level. In such filling operation the filling of the receptacle causes a somewhat abrupt upward rush of displaced air, which finds easy escape outwardly through the annular openings 35.

It will be understood that the various features of the invention may be changed or modified in size, shape, proportions, or otherwise to adapt the machine to various sizes, shapes and kinds of receptacles, whether of the ordinary paper form or of metal, glass, as in any of the conventional forms of milk bottles, or the like. Also that the improvement is readily adaptable to the filling of such various kinds of receptacles, merely by adapting the lower terminal of the outer casing to their receiving tops, as will be readily understood.

Having described my invention, what I claim is:

1. In combination with a unit measuring machine having a rotatable drum provided with a transverse plunger opening and a gravitating suction plunger having terminal heads beyond a middle contracted body portion with an elongated annular sealing cavity providing for and effecting a pneumatically sealed outlet opening, a receptacle filler consisting of a depending outer shell and a discharge tube extending within the shell from said outlet opening provided with a restricted area terminal having a transverse resistance element.

2. In combination with a unit measuring machine having a rotatable drum provided with a transverse plunger opening and a gravitating suction plunger having terminal heads beyond a middle contracted body portion with an elongated annular sealing cavity providing for and effecting a pneumatically sealed outlet opening, a receptacle filler consisting of a depending outer shell and a discharge tube extending within the shell from said outlet opening and having a restricted area delivery end terminating adjacent the lower end of the shell provided with a cross wire.

3. In combination with a unit measuring machine having a rotatable drum provided with a transverse plunger opening and a gravitating suction plunger having terminal heads beyond a middle contracted body portion with an elongated annular sealing cavity providing for and effecting a pneumatically sealed outlet opening, a receptacle filler consisting of a depending outer shell having an air circulation opening through its side, and a discharge tube extending within the shell from said outlet opening having a transverse resistance element.

4. In combination with a unit measuring machine having a rotatable drum provided with a transverse plunger opening and a gravitating suction plunger having terminal heads beyond a middle contracted body portion with an elongated annular sealing cavity providing for and effecting a pneumatically sealed outlet opening, a receptacle filler consisting of a depending outer shell having a bottom receptacle-engaging terminal, and a discharge tube extending within the shell and having a restricted area delivery end terminating adjacent said terminal and provided with a cross wire.

5. In combination with a unit measuring machine having a rotatable drum provided with a transverse plunger opening and a gravitating suction plunger having terminal heads beyond a middle contracted body portion with an elongated annular sealing cavity providing for and effecting a pneumatically sealed outlet opening, a receptacle filler consisting of a depending outer shell having a bottom receptacle-engaging terminal, and a straight discharge tube extending within the shell and having an abruptly contracted outlet opening terminating adjacent said terminal and provided with a cross wire.

6. In combination with a unit measuring machine having an outlet opening, a receptacle filler consisting of a depending outer shell having a bottom receptacle-engaging terminal, and a discharge tube extending within the shell and terminating adjacent said terminal and having a transverse resistance element.

7. In combination with a unit measuring machine having an outlet opening, a receptacle filler consisting of a depending outer shell having a bottom receptacle-engaging terminal, and a discharge tube extending within the shell and terminating adjacent said terminal and provided with a resisting cross wire.

8. In a receptacle filler, in combination with an upper open bottom cylindrical casing having a rotatable drum provided with a transverse plunger opening and a gravitating suction plunger having terminal heads beyond a middle contracted body portion with an elongated annular sealing cavity providing for and effecting a pneumatically sealed outlet opening, a discharge tube depending below the outlet opening of the casing in sealed connection therewith and having a lower outlet opening, and a two-part separable casing with a flange-receiving space between said parts, one part having an endmost receptacle-engaging terminal.

9. In a receptacle filler having an outlet opening for a measured amount of commodity, an outer casing depending around and below the outlet opening, a separable extension thereof having a receptacle-engaging terminal, and an inner discharge tube secured between the casing and its extension and disposed downwardly through and terminating adjacent the terminal of said extension.

10. In a receptacle filler having an outlet opening for a measured amount of commodity, an outer casing removably secured around and depending below the outlet opening, a separable extension thereof having a receptacle-engaging terminal, and an inner discharge tube secured between the casing and its extension and disposed downwardly through and terminating adjacent the terminal of said extension.

11. In a receptacle filler for delivering a measured amount of plastic material, the combination with means sealed while in action for extracting a portion from a main mass and a delivery conduit depending therefrom for delivering a corresponding amount downwardly through its terminal while normally full, of a ventilated casing surrounding the conduit and annularly spaced therefrom having a receptacle engaging terminal substantially on the transverse plane of the delivery conduit terminal, said delivery conduit embodying a transverse resistance element.

CHRISTIAN N. BERGMANN.